United States Patent
Kim

(10) Patent No.: US 7,555,069 B2
(45) Date of Patent: Jun. 30, 2009

(54) APPARATUS AND METHOD FOR RECEIVING A FORWARD PACKET DATA CONTROL CHANNEL IN A MOBILE COMMUNICATION SYSTEM SUPPORTING PACKET DATA SERVICE

(75) Inventor: Min-Goo Kim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 732 days.

(21) Appl. No.: 10/954,306

(22) Filed: Oct. 1, 2004

(65) Prior Publication Data

US 2005/0138531 A1 Jun. 23, 2005

(30) Foreign Application Priority Data

Oct. 2, 2003 (KR) ............... 10-2003-0068951

(51) Int. Cl.
*H04L 27/06* (2006.01)
(52) U.S. Cl. ............................................ 375/340
(58) Field of Classification Search ................ 375/340, 375/341; 714/758, 792, 794, 795, 798, 799
See application file for complete search history.

(56) References Cited

U.S. PATENT DOCUMENTS

| | | | | |
|---|---|---|---|---|
| 5,907,586 | A * | 5/1999 | Katsuragawa et al. | 375/341 |
| 6,606,726 | B1 * | 8/2003 | Wilhelmsson et al. | 714/758 |
| 6,744,746 | B1 * | 6/2004 | Bartelme | 370/329 |
| 6,892,343 | B2 * | 5/2005 | Sayood et al. | 714/779 |

| | | | |
|---|---|---|---|
| 2004/0001428 | A1 * | 1/2004 | Datta et al. ......... 370/208 |

FOREIGN PATENT DOCUMENTS

| | | |
|---|---|---|
| CN | 1151669 A | 6/1997 |
| CN | 1234160 A | 11/1999 |
| EP | 1349313 | 10/2003 |
| JP | 63-033028 | 2/1988 |
| JP | 08-032458 | 2/1996 |
| JP | 10-190632 | 7/1998 |
| JP | 2000-244336 | 9/2000 |
| JP | 2001-503233 | 3/2001 |
| JP | 2002-009635 | 1/2002 |
| KR | 2003-31307 | 4/2003 |
| KR | 2003-91245 | 12/2003 |
| KR | 2004-79660 | 9/2004 |
| WO | WO 03/049308 | 6/2003 |

* cited by examiner

*Primary Examiner*—Chieh M Fan
*Assistant Examiner*—Jaison Joseph
(74) *Attorney, Agent, or Firm*—Roylance, Abrams, Berdo & Goodman, L.L.P.

(57) ABSTRACT

A forward packet data control channel (F-PDCCH) receiver for reducing alarms relating to errors in a packet data control channel for transmitting a control signal in a mobile communication system and a method of using the same. In the F-PDCCH receiver, a decoding part decodes received symbols and calculates an information word and an absolute value of a difference between two path metrics. A false alarm reduction function compares the absolute value received from the decoding part with a predetermined threshold, and outputs a decoding value indicating whether an alarm is generated according to the comparison result. A blind slot format detector detects a blind slot format based on the absolute value received from the decoding part.

14 Claims, 12 Drawing Sheets

APPARATUS AND METHOD FOR RECEIVING A FORWARD PACKET DATA CONTROL CHANNEL IN A MOBILE COMMUNICATION SYSTEM SUPPORTING PACKET DATA SERVICE

PRIORITY

This application claims the benefit under 35 U.S.C. § 119 of an application entitled "Apparatus and Method for Receiving Forward Packet Data Control Channel in a Mobile Communication System Supporting Packet Data Service" filed in the Korean Intellectual Property Office on Oct. 2, 2003 and assigned Serial No. 2003-68951, the entire contents of which are incorporated herein by reference.

BACKGROUND OF THE INVENTION

1. Field of the Invention

The present invention relates generally to an apparatus and method for receiving a packet data control channel in a mobile communication system. In particular, the present invention relates to a forward packet data control channel receiving apparatus and method for overcoming reception errors in a packet data control channel used for transmitting a control signal for forward packet data in a Code Division Multiple Access (CDMA) system.

2. Description of the Related Art

Mobile communication systems capable of supporting voice and short message services are developing into advanced mobile communication systems capable of supporting a multimedia service such as high-speed packet data and moving image services as well as voice service. For example, a mobile communication system supporting a packet data service includes a CDMA2000 First Evolution-Data Only (1x EV-DO) system supporting only a packet data service and a CDMA2000 First Evolution-Data and Voice (1x EV-DV) system supporting voice and packet data services. Herein, the mobile communication system supporting the packet data service refers to the CDMA2000 1x EV-DV system. The CDMA2000 1x EV-DV system uses a forward packet data channel (F-PDCH) for transmitting packet data to a mobile station, and a forward packet data control channel (F-PDCCH) for transmitting a control signal for the packet data synchronized with the forward packet data channel. A relationship between the F-PDCH and the F-PDCCH will be described herein below with reference to the accompanying drawings.

FIG. 1 is a diagram illustrating a configuration of a general CDMA2000 1x EV-DV system. As illustrated in FIG. 1, a base station (BS) 10 is in communication with a plurality of mobile stations (MSs) 21, 22 and 23. To transmit forward high-speed packet data to a particular mobile station, the base station 10 transmits the data over the F-PDCH which is a forward high-speed packet data channel.

The F-PDCCH is a physical channel for carrying a control message that the base station 10 should transmit when there are packets to be transmitted to the in service mobile stations 21, 22 and 23. The F-PDCCH is transmitted the same time as that of F-PDCH for carrying a transmission packet. That is, in order to transmit high-speed packet data, the base station 10 should transmit F-PDCCH together with the F-PDCH. The F-PDCCH has 3 types of slot formats: 1.25 msec (1 slot), 2.5 msec (2 slots), and 5.0 msec (4 slots). The slot formats are selected by a scheduler of the base station 10 every transmission by combining channel information (including a carrier-to-noise ratio (CNR) and a carrier-to-interference ratio (CIR)) and a state of a buffer where transmission data is stored. Herein, the base station 10 does not transmit slot format information (SFI) of the F-PDCCH, determined by the base station 10, to the in service mobile stations 21, 22 and 23. Therefore, the F-PDCCH receivers of the mobile stations 21, 22 and 23 must detect slot format information determined by the base station 10 from a received F-PDCCH signal. Such a slot format detection scheme for a mobile station is called "Blind Slot Format Detection (BSFD)."

FIG. 2 is a diagram illustrating a structure of a forward packet data control channel in a general CDMA2000 1x EV-DV system. In FIG. 2, 1-slot format, 2-slot format and 4-slot format are represented by n=1, n=2 and n=4, respectively. In a 1x EV-DV system, forward packet data control channel information bits (13 bits) transmitted over F-PDCCH refer to a control message. The F-PDCCH uses convolutional codes in order to correct errors occurring in the 13-bit control message, or forward packet data control channel information bits (13 bits), from noises occurring in a transmission channel, and uses Cyclic Redundancy Check (CRC) codes for error detection.

As illustrated in FIG. 2, the control message is input to an adder 31. In addition, because the 1x EV-DV system is a synchronous system, a system time synchronized to a reference time is input to an offset selector 41. The system time is used to randomize information bits transmitted over a forward packet data control channel and convert the randomized information bits into a random sequence. Therefore, a 13-bit random number is received from the system time every 1.25 msec. Accordingly, the offset selector 41 inputs an offset to a Medium Access Control layer Identification (MAC_ID) combiner 32 synchronized with the system time.

The MAC_ID combiner 32 receives 8-bit MAC_IDs for identifying users. In the MAC_ID combiner 32, an 8-bit CRC covered with a MAC_ID is called an "inner frame quality indicator," and another 8-bit CRC is called an "outer frame quality indicator." The outer frame quality indicator is exclusive-ORed (or XORed) with an 8-bit binary pattern called a MAC_ID before being transmitted. The reason for XORing a control message with a MAC_ID in the MAC_ID combiner 32 is because double CRCs are used. Therefore, the outer frame quality indicator is represented by an "8-bit CRC-covered MAC_ID." Here, the MAC_ID refers to a unique number used by a base station in identifying a mobile station.

Information output from the MAC_ID combiner 32 is input to a CRC adder 33. The CRC adder 33 adds an 8-bit CRC to the information output from the MAC_ID combiner 32 so that a receiver can determine whether a received control message is defective. Information output from the CRC adder 33 is input to a tail bit adder 34. The tail bit adder 34 adds 8 tail bits to the CRC-added information. Here, the added tail bits are used for zero state termination of convolutional codes. The CRC structure and detailed blocks thereof will be described in brief. If a 13-bit information word and 8 tail bits are all received, convolutional codes always terminate at a zero state on a trellis in terms of path propagation. Information output from the tail bit adder 34 is input to a convolutional encoder 35. The convolutional encoder 35 performs encoding for correcting an error in a transmission control message from noises occurring in a radio environment of a forward packet data control channel. A coding rate is set differently according to the slot format.

An output of the convolutional encoder 35 undergoes symbol repetition in a symbol repeater 36, and undergoes symbol puncturing in a symbol puncturer 37, and an output of the symbol puncturer 37 is input to a block interleaver 38. The block interleaver 38 block-interleaves input symbols according to the slot format, and the block-interleaved symbols undergo signal mapping in a signal point mapper 39. The mapped symbols after being block-interleaved are multiplied by a channel gain in a channel gainer 40, and then transmitted over a forward packet data control channel.

Aside from a control message for F-PDCH, a receiver can transmit information for correctly recognizing information on a Walsh cover used by a CDMA transmitter. This information is used to transmit Walsh information used by the base station 10 to a mobile station 21, 22 or 23 connected to the base station 10, and is called a "Walsh mask," and 13-bit information is used for the Walsh mask. If 8 MAC_ID bits are all '0', the base station 10 transmits Walsh mask information used for a 13-bit information word of F-PDCCH. However, if 8 MAC_ID bits are not all '0', the base station 10 transmits a control message (for example, packet size and coding rate) for the F-PDCH transmitted with the 13-bit information word. Therefore, the mobile stations 21, 22 and 23 always check the MAC_ID during the F-PDCCH decoding, and perform different operations according to whether the 8 MAC_ID bits are all '0' as a result of the check.

A structure of a receiver for receiving F-PDCCH in a CDMA2000 1x EV-DV system using F-PDCCH and an example for checking performance of the receiver will be described herein below with reference to accompanying drawings.

FIG. 3 is a diagram illustrating a structure of a F-PDCCH transceiver in a general CDMA2000 1x EV-DV system. Referring to FIG. 3, when data is received, a double CRC adder 51 performs double CRC processing on the received data using the MAC_ID and CRC added thereto, and the double CRC-processed data is coded in a convolutional encoder 52. The coded symbols are subjected to symbol repetition and symbol puncturing in a symbol repeating and puncturing part 53, and then subjected to channel interleaving in a channel interleaver 54. The channel interleaver 54 is used to scatter burst errors occurring in a received signal due to a multipath fading channel. The interleaved symbols are input to a receiver through a channel environment 80.

The receiver is roughly divided into a reception processor 60 and a blind slot format detector 70. The reception processor 60 includes a channel deinterleaver 61, a symbol combining/zero inserting part 62, a Viterbi decoder 63, and a CRC/MAC_ID checker 64. A channel deinterleaver 61 deinterleaves received symbols. A symbol combining and zero insertion part 62 performs a reverse process of the symbol repetition and symbol puncturing process performed for transmission of a forward packet data control channel, on the deinterleaved symbols. A Viterbi decoder 63 decodes convolutional-coded symbols and outputs a control message. A CRC/MAC_ID checker 64 checks CRC and MAC_ID in the control message.

A method for detecting a control message on a forward packet data control channel in the CRC/MAC_ID checker 64 can be roughly divided into the following two methods.

In a first method, a receiver detects an inner CRC from a 13-bit information word and an 8-bit CRC-covered MAC_ID, decoded through Viterbi decoding. The receiver can detect an information word from the CRC check result.

In a second method, a receiver sequentially checks an outer CRC, maintaining the result of the first method. The receiver can detect an information word using both the check result and a result on comparison between the MAC_IDs.

For high-speed data transmission, the CDMA2000 1x EV-DV system employs a Fast Hybrid Automatic Repeat Request (FHARQ) in order to improve the performance of a physical channel. Usually, FHARQ uses N ARQ channels, and the CDMA2000 1x EV-DV system employs N=4 FHARQ. With reference to FIGS. 4A to 4C, an example of N=4 FHARQ will be described herein below. In the drawings, A, B, C and D represent mobile stations that transmit packet data.

As illustrated in FIG. 4A, a base station, or a transmitter, can continuously perform a maximum of 4 HARQ transmissions. For example, whether or not a packet transmitted to a mobile station A is received successfully, the base station can sequentially transmit new packets to a maximum of 3 mobile stations B, C and D for a non-transmission duration until it transmits a next packet to the mobile station A. This is called "N=4 FHARQ," and this transmission scheme is called "user diversity." User diversity has been proposed for maximizing the efficiency of channel resources. For example, as illustrated in FIG. 4B, when several mobile stations requesting a packet data service are inactivated, the base station suspends transmission of the F-PDCCH and only noises exist for the non-transmission duration.

For example, as illustrated in FIG. 4C, in N=4 FHARQ, the base station can continuously transmit 4 new packets to the same mobile station A. In this case, the mobile station A continuously receives packets, and all F-PDCCHs received for a no-operation interval (NOI) are targeting the mobile station A. In FIG. 4A, it should be noted that because F-PDCCHs received for transmission durations for the mobile stations B and C, i.e., no-operation interval (NOI) of the mobile station A, are not assigned to the mobile station A, the mobile station A performs no operations. Further, each mobile station should always receive the F-PDCCH assigned thereto and perform a maximally correct operation according to a transmission protocol. In FIG. 4B, because noises received for a no-operation interval (NOI) of the mobile station A, for which no F-PDCCH is transmitted, are meaningless, the mobile station A should not enable its F-PDCCH receiver.

According to the CDMA2000 1x EV-DV standard, a mobile station using F-PDCH for packet transmission demodulates data on the F-PDCH only when the F-PDCCH is assigned thereto. Based on the demodulation result, the mobile station transmits an acknowledgement (ACK) signal or a non-acknowledgement (NAK) signal over a reverse channel. In an actual operation of the system, however, a mobile station may possibly make an error due to noises and disturbances occurring in a channel. The mobile station makes an error in the following cases.

First, an error is made when a mobile station selected by a base station fails to correctly receive the F-PDCCH transmitted by the base station due to noises or disturbances. In this case, because the mobile station fails to recognize whether the F-PDCH is transmitted due to the F-PDCCH error, although it fails to receive a packet or it receives the F-PDCH, the mobile station fails to decode the F-PDCH due to a defective control message and as a result, transmits a NAK over a reverse channel. In this case, however, because the HARQ defined in the 1x EV-DV standard is required, the base station can solve the problem using the HARQ.

Second, an error occurs when a mobile station selected by a base station fails to correctly receive the F-PDCCH transmitted by the base station due to noises or disturbances and, particularly, mistakes the MAC_ID for an all-zero MAC_ID, i.e., Walsh mask update information, due to the F-PDCCH error. In this case, the mobile station changes its own Walsh mask due to the incorrect information. Therefore, although the F-PDCHs are decoded, most of the F-PDCHs suffer from the decoding error because of the Walsh demodulation error. Thus, the mobile station transmits a NAK over a reverse channel, and such an event is continuously repeated unless a correct Walsh mask is generated again. That is, the mobile station always transmits NAKs to the base station. Such an event is illustrated in FIG. 5 by way of example. Referring to FIG. 5, a mobile station performs an incorrect Walsh mask update due to an F-PDCCH false alarm generated at time T1, and continuously generates a F-PDCH error until a time T2.

However, in the second case raising the most serious problem, a mobile station selected by a base station continuously generates an F-PDCH reception error due to the incorrect Walsh mask information unless the base station transmits a new Walsh mask information. Such events can occur in the case of FIGS. 4A and 4B. Therefore, a receiver of the mobile station needs a function capable of diagnosing incorrect Walsh mask information caused by the F-PDCCH error and correcting the incorrect Walsh mask information.

Third, an error is made when a mobile station not selected by a base station mistakes the F-PDCCH transmitted by the base station for its F-PDCCH due to noises or disturbances. In this case, the mobile station decodes F-PDCH, making a mistake that F-PDCH is received. However, the mobile station fails in the decoding and transmits a NAK over a reverse channel.

Fourth, an error is made when a mobile station not selected by a base station mistakes the F-PDCCH transmitted by the base station for its F-PDCCH due to noises or disturbances and, particularly, mistakes the MAC_ID for an all-zero MAC_ID, i.e., Walsh mask update information, due to the F-PDCCH error. In this case, the mobile station changes its own Walsh mask due to the incorrect information. Therefore, although F-PDCHs are decoded, most of the F-PDCHs suffer from a decoding error because of the Walsh demodulation error. Thus, the mobile station transmits a NAK over a reverse channel, and such an event is continuously repeated unless the Walsh mask is updated again. That is, the mobile station always transmits a NAK to the base station.

The third and fourth cases raise no serious problem in forward channels for the following reasons. That is, because the base station knows the MAC_ID of a mobile station that should receive a packet transmitted by the base station, the base station compares the MAC_ID of the mobile station received over a reverse channel, and is allowed to disregard a NAK received from the mobile station and take no action if the received MAC_ID is different from the MAC_ID included therein. However, occupation of a reverse ACK channel (R-ACKCH) for reverse transmission of ACK/NAK and a reverse channel quality indicator channel (R-CQICH) for transmission of the CIR by the non-selected mobile station causes unnecessary occupation of reverse channel resources and interference to the R-ACKCH of a normal mobile station, thereby deteriorating the quality of the R-ACKCH signal from the selected mobile station.

As described above, in CDMA2000 1x EV-DV, a mobile station should accurately analyze the SFI transmitted by a base station, and a reliability factor check should be made on the analysis result on the SFI transmitted by the base station. That is, although the mobile station detects the SFI, it should detect the correct 13 information bits and MAC_ID. If an incorrect information word is received, the mobile station makes the above-stated errors. Above all, an error occurring in the MAC_ID may invite a very serious problem. Such a problem is not fully considered even in the future system. Of course, although the CRC is used as a method for solving such a problem, successive data packets transmitted using the same MAC_ID are all defective due to an error in the MAC_ID for a no-operation interval (NOI), thereby causing deterioration in reliability of the operation of the receiver.

SUMMARY OF THE INVENTION

It is, therefore, an object of the present invention to provide an apparatus and method for reducing a false alarm rate (FAR) of packet data control channels in a Code Division Multiple Access (CDMA) system.

It is another object of the present invention to provide a false alarm rate reducing apparatus and method for preventing misoperation of a mobile station from occurring when a mobile station selected by a base station receives an incorrect control message due to a reception error in a packet data control channel.

It is further another object of the present invention to provide a false alarm rate reducing apparatus and method for preventing inefficient use of reverse channel resources and interference due to misoperation of a mobile station when a mobile station not selected by a base station receives an incorrect control message due to a reception error in a packet data control channel.

It is yet another object of the present invention to provide a false alarm rate reducing apparatus and method f-or removing incorrect Walsh mask information by pre-determining whether Walsh update information is true or false, and replacing the incorrect Walsh mask information with correct Walsh mask information.

To achieve the above and other objects, there is provided a forward packet data control channel (F-PDCCH) receiver for reducing alarms relating to errors in a packet data control channel for transmitting a control signal in a mobile communication system. In the F-PDCCH receiver, a decoding part decodes received symbols and calculates an information word and an absolute value of a difference between two path metrics. A false alarm reduction function compares the absolute value received from the decoding part with a predetermined threshold, and outputs a decoding value indicating whether an alarm is generated according to the comparison result. A blind slot format detector detects a blind slot format based on the absolute value received from the decoding part.

To achieve the above and other objects, there is provided a method for reducing alarms relating to errors in a packet data control channel for transmitting a control signal in a mobile communication system. The method comprises decoding received symbols and calculating an information word and an absolute value of a difference between two path metrics; comparing the calculated absolute value with a predetermined threshold, and outputting a decoding value indicating whether an alarm is generated according to the comparison result; and detecting a blind slot format based on the calculated absolute value.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

An embodiment of the present invention will now be described in detail with reference to the accompanying drawings. In the following description, a detailed description of known functions and configurations incorporated herein has been omitted for conciseness.

The present invention relates to physical channels used in Code Division Multiple Access 2000 (CDMA2000) 1x Rev.C, a synchronous CDMA mobile communication system (hereinafter referred to as First Evolution-Data and Voice (1x EV-DV)). It should be noted that the embodiment of the present invention is not restricted only to CDMA2000 1x REV.C, but can be applied to transmission control channels used in High Speed Downlink Packet Access (HSDPA) for asynchronous Wideband CDMA (WCDMA). Further, the embodiment of the present invention uses supplementary slot format decision information in addition to the exiting factors. The embodiment of the present invention improves performance of Blind Slot Format Detection (BSFD) using a metric difference of maximum-likelihood state (MD_MLS), which is a metric difference of a Viterbi decoder, in the slot format decision information.

Figure 6:
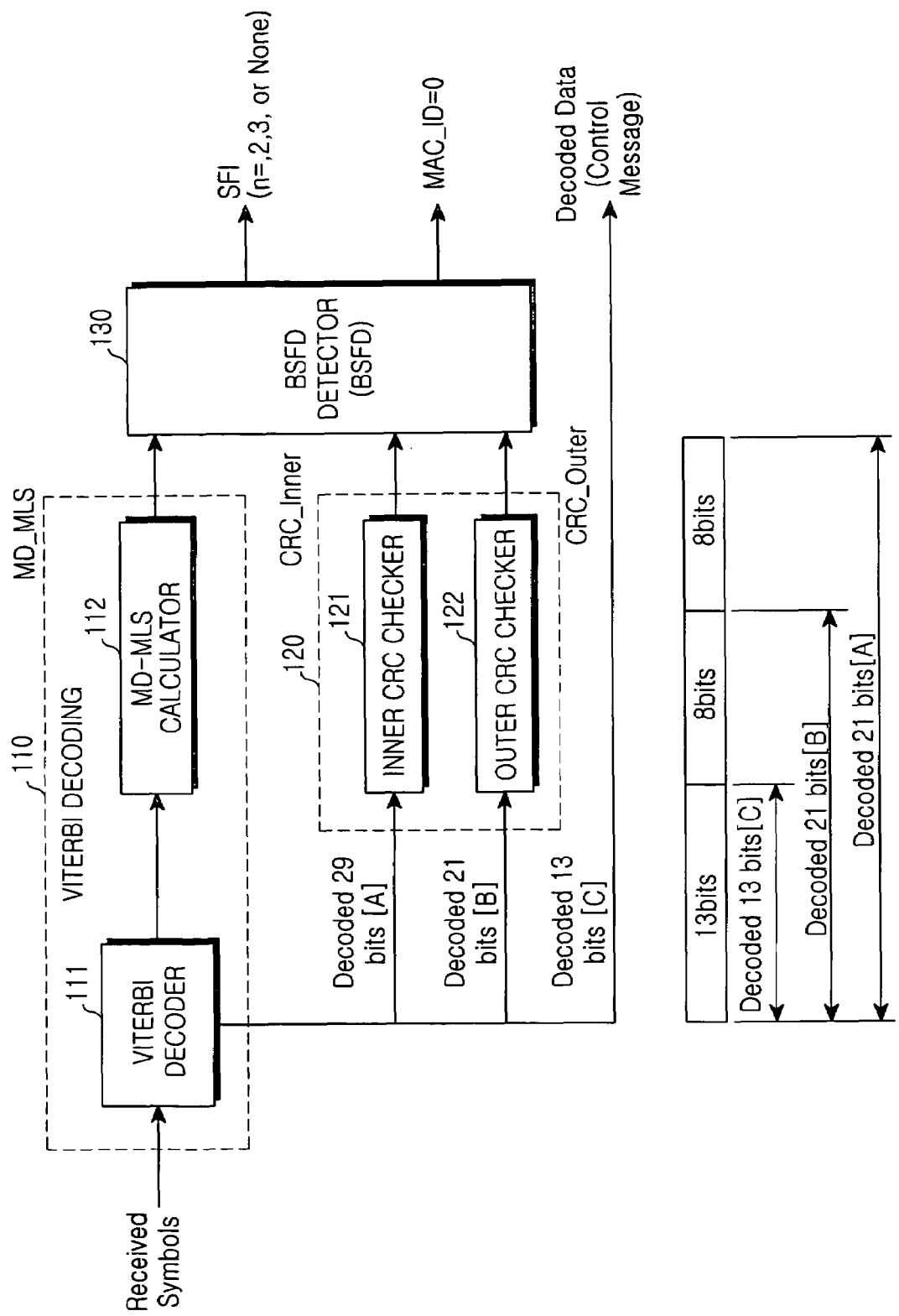
FIG. 6 is a diagram illustrating a structure of a F-PDCCH receiver in a CDMA2000 1x EV-DV system according to an embodiment of the present invention.

FIG. 6 is a diagram illustrating a structure of a forward packet data control channel (F-PDCCH) receiver in a CDMA2000 1x EV-DV system according to an embodiment of the present invention. Referring to FIG. 6, an F-PDCCH receiver detects a blind slot format using MD_MLS. The F-PDCCH receiver includes a Viterbi decoding part 110 for calculating MD_MLS by Viterbi-decoding symbols received according to slot formats, and a BSFD detector 130 for detecting a blind slot format based on the calculated MD_MLS. Further, the F-PDCCH receiver includes a CRC checking part 120 for performing a Cyclic Redundancy Check (CRC) check on an information word of 29 decoded bits output from the Viterbi decoding part 110.

The Viterbi decoding part 110 comprises a Viterbi decoder 111 for Viterbi-decoding received signals, and an MD_MLS calculator 112 for calculating MD_MLS. The MD_MLS calculator 112 calculates MD_MLS representing an absolute value of a difference between two path metrics input to a zero state which is a maximum likelihood state, each time decoding is performed at each of n=1 SFI, n=2 SFI and n=4 SFI. The MD_MLS calculator 112 outputs MD_MLS_1, MD_MLS_2 and MD_MLS_4 for n=1 SFI, n=2 SFI and n=4 SFI, respectively. The two path metrics refer to a survivor path and a competitor path, which join together at a zero state at the last stage of a frame. Although the MD_MLS calculator 112 is separated herein from the Viterbi decoder 111, in an embodiment of the present invention the MD_MLS calculator 112 may be included in the Viterbi decoder 111. In addition, the Viterbi decoder can be replaced with a different kind of decoder.

The CRC checking part 120 comprises an inner CRC checker 121 and an outer CRC checker 122. The CRC checking part 120 performs a CRC check on an inner CRC and an outer CRC, and outputs the CRC check results to the BSFD detector 130. The inner CRC checker 121 performs a CRC check on an information word A of preferably 29 decoded bits output from the Viterbi decoder 111, and the outer CRC checker 122 performs a CRC check on an information word B of preferably 21 decoded bits output from the Viterbi decoder 111. Among information words output from the Viterbi decoder 111, preferably a 13-bit information word C is output as a control message. Also, the outer CRC checker 122 can perform Medium Access Control layer Identification (MAC_ID) check.

The BSFD detector 130 determines the correct slot format information (SFI) and whether the MAC_ID is 0 from the received inner CRC, outer CRC and MD_MLS, and determines a 13-bit information word C of the decoded F-PDCCH.

Figure 7:
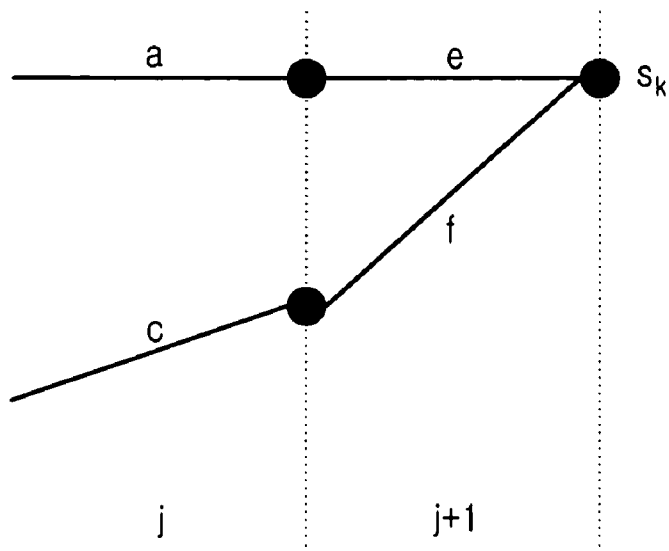
FIG. 7 is a diagram illustrating an example of a path metric calculation and comparison in a Viterbi decoding part according to an embodiment of the present invention.

With reference to FIG. 7, a description will now be made of a method for calculating a path metric difference between a survivor path and a competitor path in the F-PDCCH receiver.

As illustrated in FIG. 7, the Viterbi decoding part 110 considers only a zero state because all code words always join together at the zero state on a trellis by zero state termination. The Viterbi decoding part 110 calculates a path metric difference between a survivor path and a competitor path, which join together at a zero state at the last stage of a frame. An absolute value MD_MLS of the calculated path metric difference increases as a signal-to-noise ration (SNR) of a received signal increases. In addition, the ML_MLS decreases as SNR of a received signal decreases. The MD_MLS is also called a "Yamamoto quality difference" in honor of Mr. Yamamoto who submitted a paper disclosing the contents of MD_MLS.

For these reasons, a system using the Viterbi decoding part 110 can detect an error using MD_MLS. For example, when a value of MD_MLS is smaller than a particular threshold, the Viterbi decoding part 110 outputs a signal (or alarm) indicating that its decoding result is false or incorrect, so that an error can be detected. This is well known to those skilled in the art, so a detailed description thereof will be omitted.

A description will now be made of a method for detecting an error in an F-PDCCH receiver for a mobile communication system having a Viterbi decoder that uses a difference between two path metrics.

For example, as illustrated in FIG. 7, paths joining at one state (or node) on a trellis are classified into a survivor path and a competitor path as described above. If a path metric corresponding to each path is defined as $\lambda(x)$, a reliability function is defined as a difference between the two path metrics, and the reliability function changes in value by a threshold A. This is represented by the following equations:

$$\lambda_j(a-e) \geq \lambda_j(c-f) + A \text{ or } \lambda_j(a-e) - \lambda_j(c-f) \geq A \quad (1)$$

In Equation (1), 'A' denotes a constant having a positive value, and is a value for determining a detection rate of a decoder. As a value of 'A' is larger, an error detection rate increases but error correction capability decreases. Therefore, the best 'A' must be determined according to a system in use. Such a method should be considered in a system using block convolutional codes with a coding rate of 1/b, and a description thereof will be made herein below.

An information word transmitted by a transmitter is defined as I, a length thereof is defined as L, and a code word corresponding thereto is defined as C. In addition, a sequence transmitted by antipodal signaling (0/1 or +m/−m) this code word is defined as X. Here, 'm' denotes a size of a transmission symbol. If an additive white Gaussian noise existing in a channel is defined as N, a sequence Y that a receiver receives becomes Y=X+N. The code word and sequences are expressed as Equations (2) to (6) shown below. In Equations (2) to (6), {R} denotes a set of real numbers, and a received signal has all possible real numbers.

$$I=(i_0,i_1,i_2,\ldots i_k i_{k+1},\ldots i_{L-1}) \quad (2)$$

$$C=(c_0,c_1,c_2,\ldots c_k,c_{k+1},\ldots c_{L-1}), \text{ where } c_j=(c_j^0, c_j^1,\ldots c_j^{b-1}), c_j^s \in \{0,1\} \quad (3)$$

$$X=(x_0,x_1,x_2,\ldots x_k,x_{k+1},\ldots x_{L-1}), \text{ where } x_j=(x_j^0, x_j^1,\ldots x_j^{b-1})x_j^s \in \{R\} \quad (4)$$

$$N=(n_0,n_1,n_2,\ldots n_k,n_{k+1},\ldots n_{L-1}), \text{ where } n_j=(n_j^0, n_j^1,\ldots n_j^{b-1})n_j^s \in \{R\} \quad (5)$$

$$Y=(y_0,y_1,y_2,\ldots y_k,y_{k+1},\ldots y_{L-1}), \text{ where } y_j=(y_j^0, y_j^1,\ldots y_j^{b-1})y_j^s \in \{R\} \quad (6)$$

Therefore, the Viterbi decoding part 110 should detect a sequence C of a maximum likelihood from the received sequence Y. To this end, the Viterbi decoding part 110 calculates a path metric, and continues along the path corresponding to the entire frame or block size while accumulating the calculation result, thereby determining a maximum likelihood path. A detailed description of a method for calculating the path metric will be made with reference to the accompanying drawings.

Figure 8:
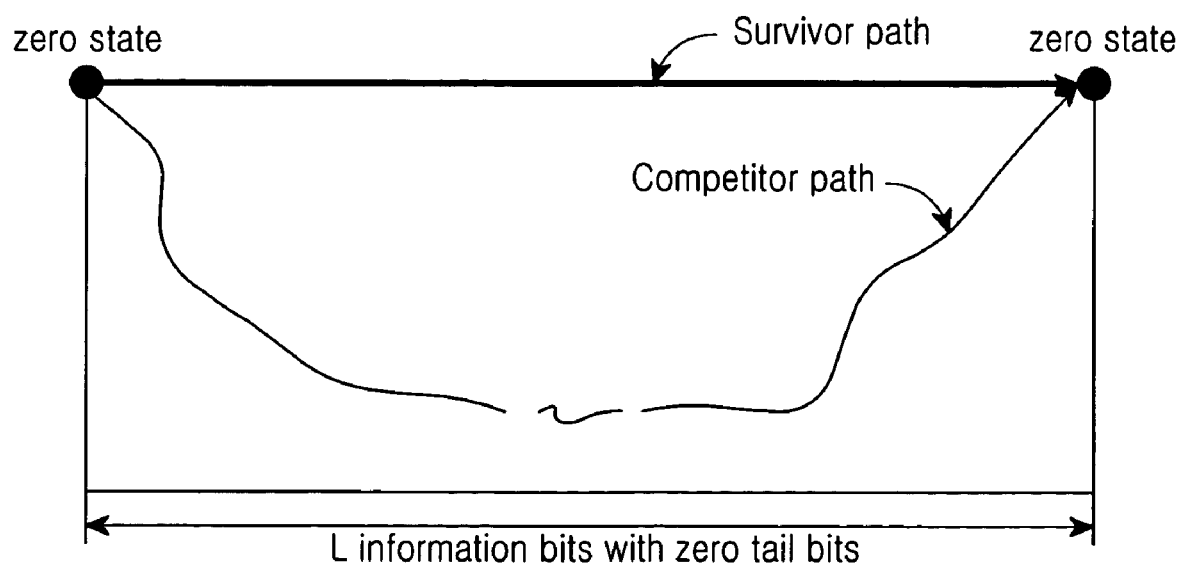
FIG. 8 is a diagram illustrating a method of calculating a path metric and MD_MLS by a Viterbi decoding part according to an embodiment of the present invention.

FIG. 8 is a diagram illustrating a method of calculating a path metric and MD_MLS by a Viterbi decoding part according to an embodiment of the present invention. Referring to FIG. 8, in order to calculate MD_MLS, the Viterbi decoding part 110 preserves all path metrics from the first branch to the last $(L-1)^{th}$ branch. This is because when an absolute value of a path metric is changed due to normalization in an intermediate process, an incorrect reliability function value is provided according to a length L of an information word. Therefore, when normalization is required, it is necessary to compensate for the normalized value later. To this end, the normalized value should be stored. The normalized value is stored using a type of normalization constant scaling factor.

Next, the Viterbi decoding part 110 calculates a path metric between a survivor path and a competitor path at a zero state of a $L^{th}$ branch, i.e., the last state or the maximum likelihood state (MLS). The path metrics of a survivor path and a competitor path are represented by $$\lambda_{surv}(L) = \sum_{k=0}^{L-1} \log\{Pr(Y \mid X_{surv})\} \quad (7)$$

$$\lambda_{comp}(L) = \sum_{k=0}^{L-1} \log\{Pr(Y \mid X_{comp})\} \quad (8)$$

Therefore, MD_MLS is calculated as an absolute value of a path metric difference between the survivor path and the competitor path, and this is expressed as $$MD\_MLS = |\lambda_{surv}(L) - \lambda_{comp}(L)| \quad (9)$$

$$= \left|\sum_{k=0}^{L-1} \log\{Pr(Y \mid X_{surv})\} - \sum_{k=0}^{L-1} \log\{Pr(Y \mid X_{comp})\}\right|$$

Figure 3:
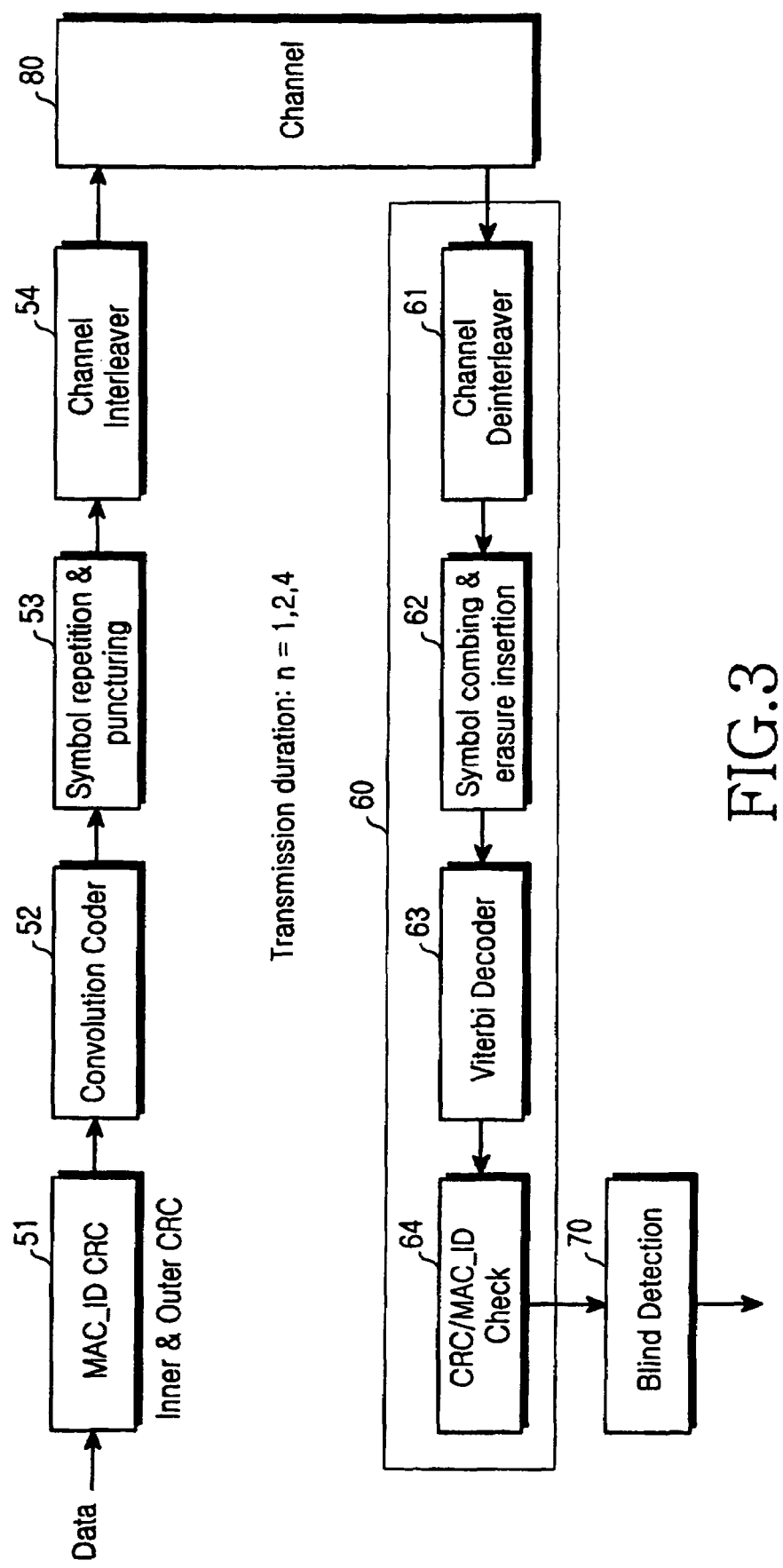
FIG. 3 is a diagram illustrating a structure of a forward packet data control channel (F-PDCCH) transceiver in a conventional CDMA2000 1x EV-DV system.
Figure 4A:
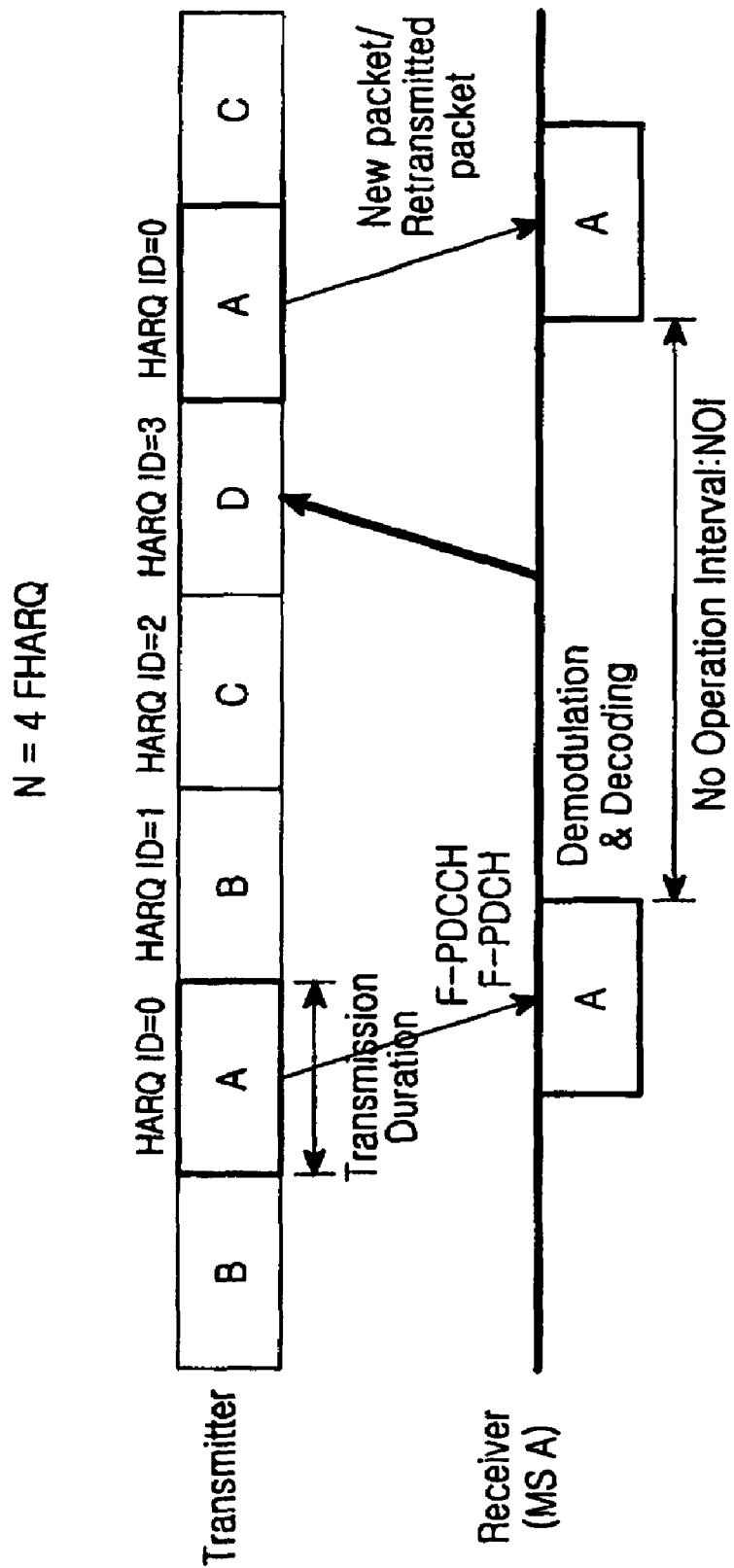
FIGS. 4A to 4C are diagrams illustrating examples of a Fast Hybrid Automatic Repeat Request (FHARQ) in a conventional CDMA2000 1x EV-DV system.
Figure 4B:
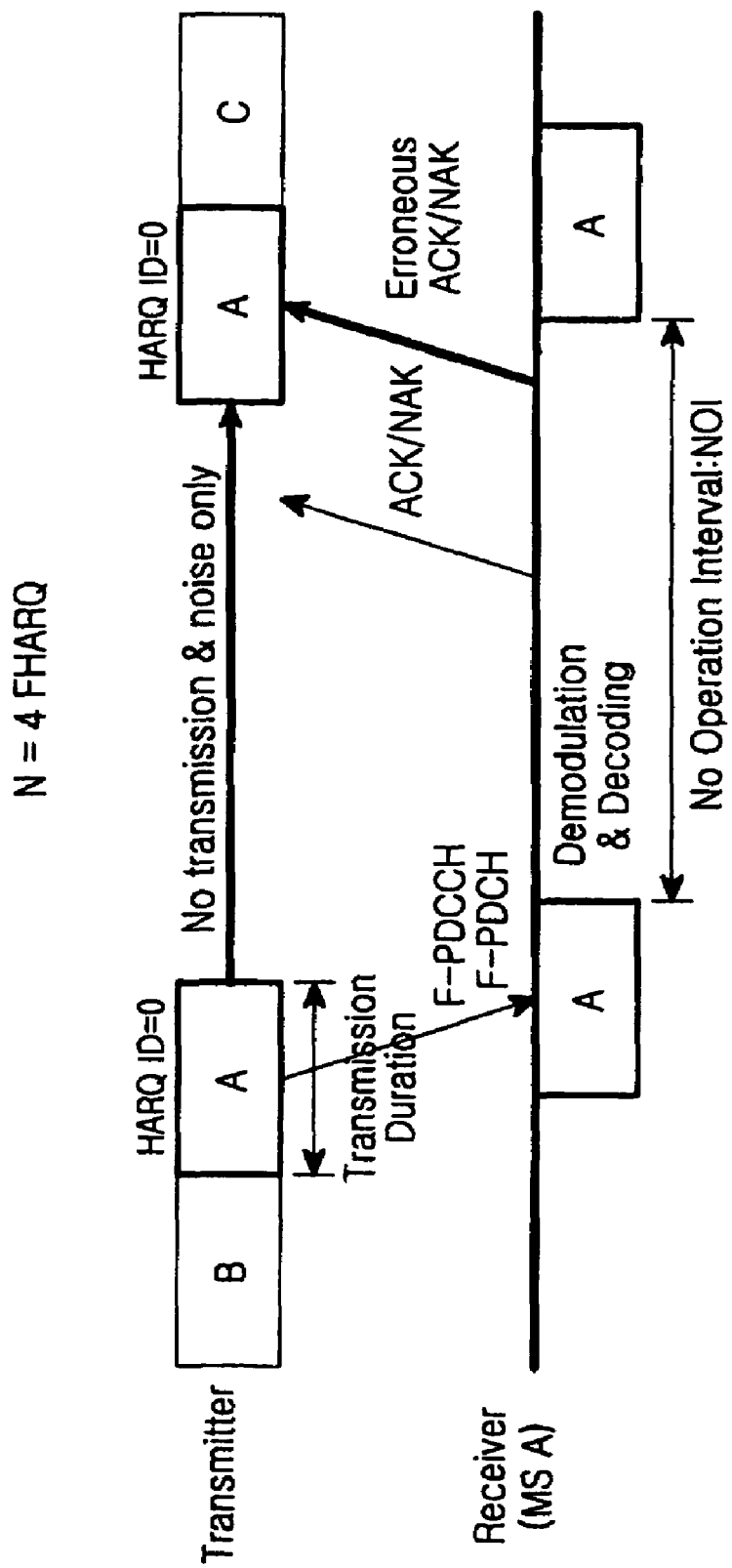
Figure 4C:
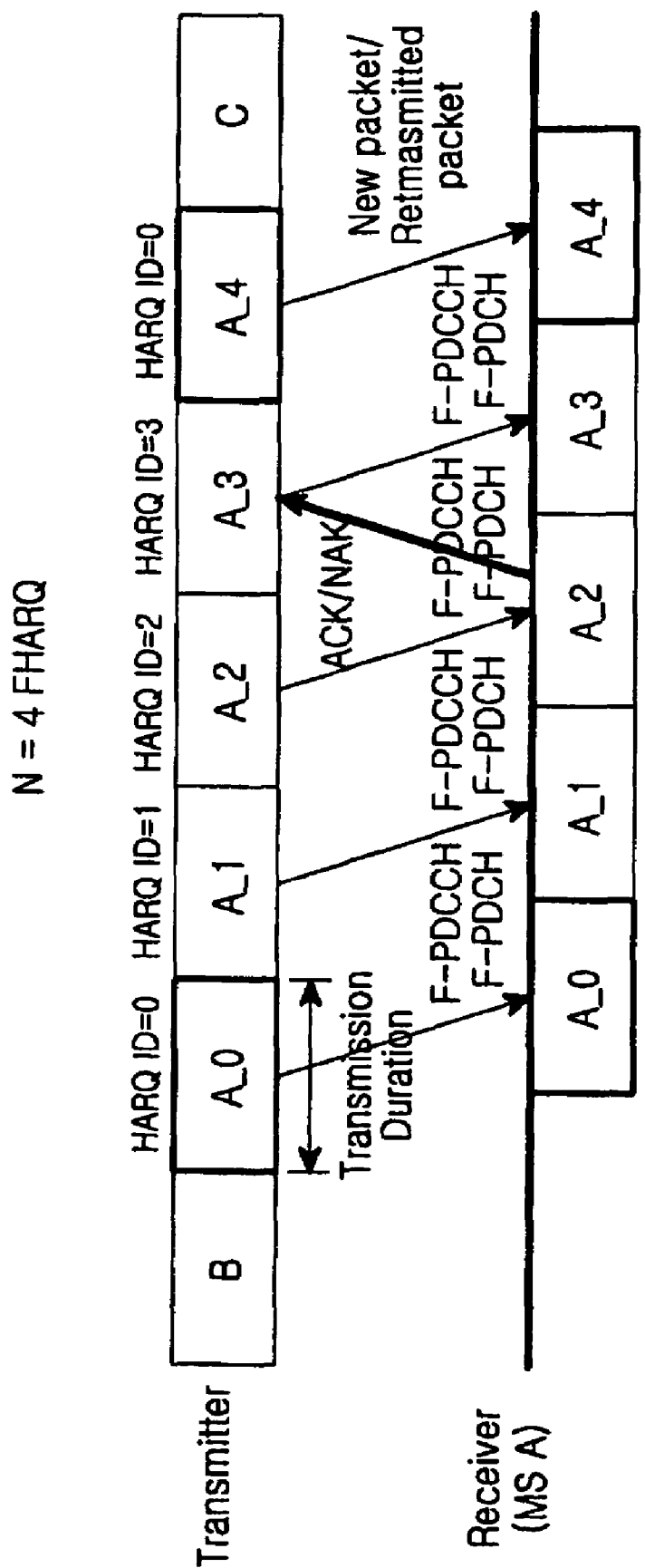
Figure 5:
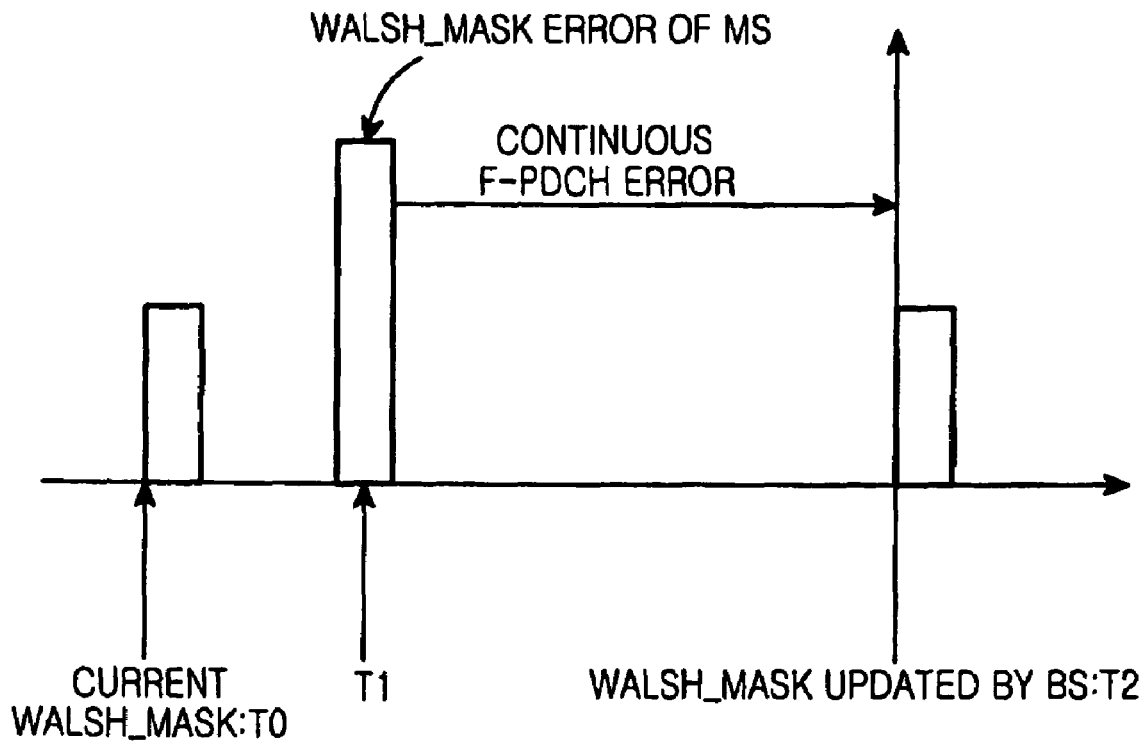
FIG. 5 is a diagram illustrating an example in which an error occurs in a packet data channel due to an F-PDCCH error in a conventional CDMA2000 1x EV-DV system.

With reference to FIGS. 4A to 4C, a description will now be made of a change in size of MD_MLS when a FHARQ transceiver of FIG. 3 continuously/discontinuously transmits an ACK/NAK.

Figure 1:
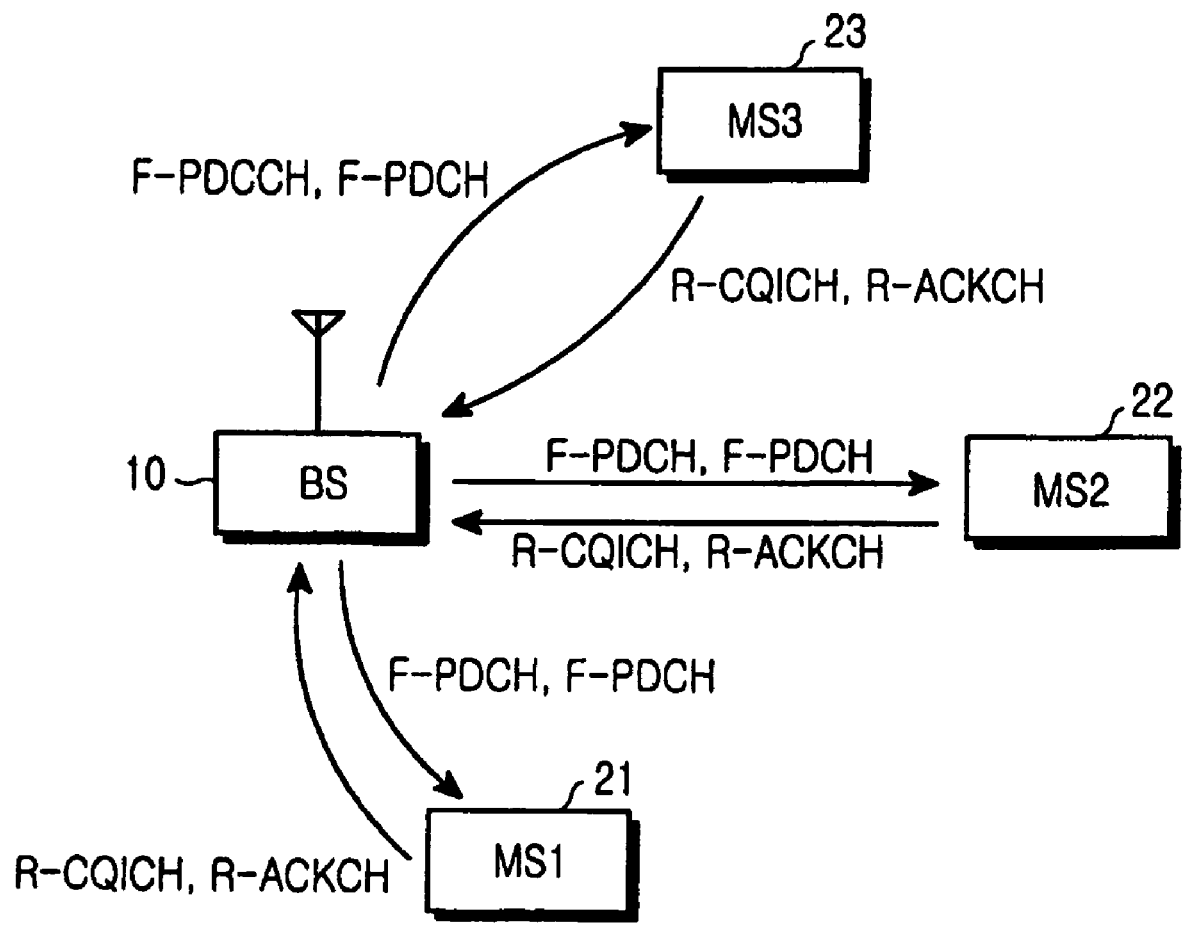
FIG. 1 is a diagram illustrating a configuration of a conventional Code Division Multiple Access 2000 (CDMA2000) First Evolution-Data and Voice (1x EV-DV) system.
Figure 2:
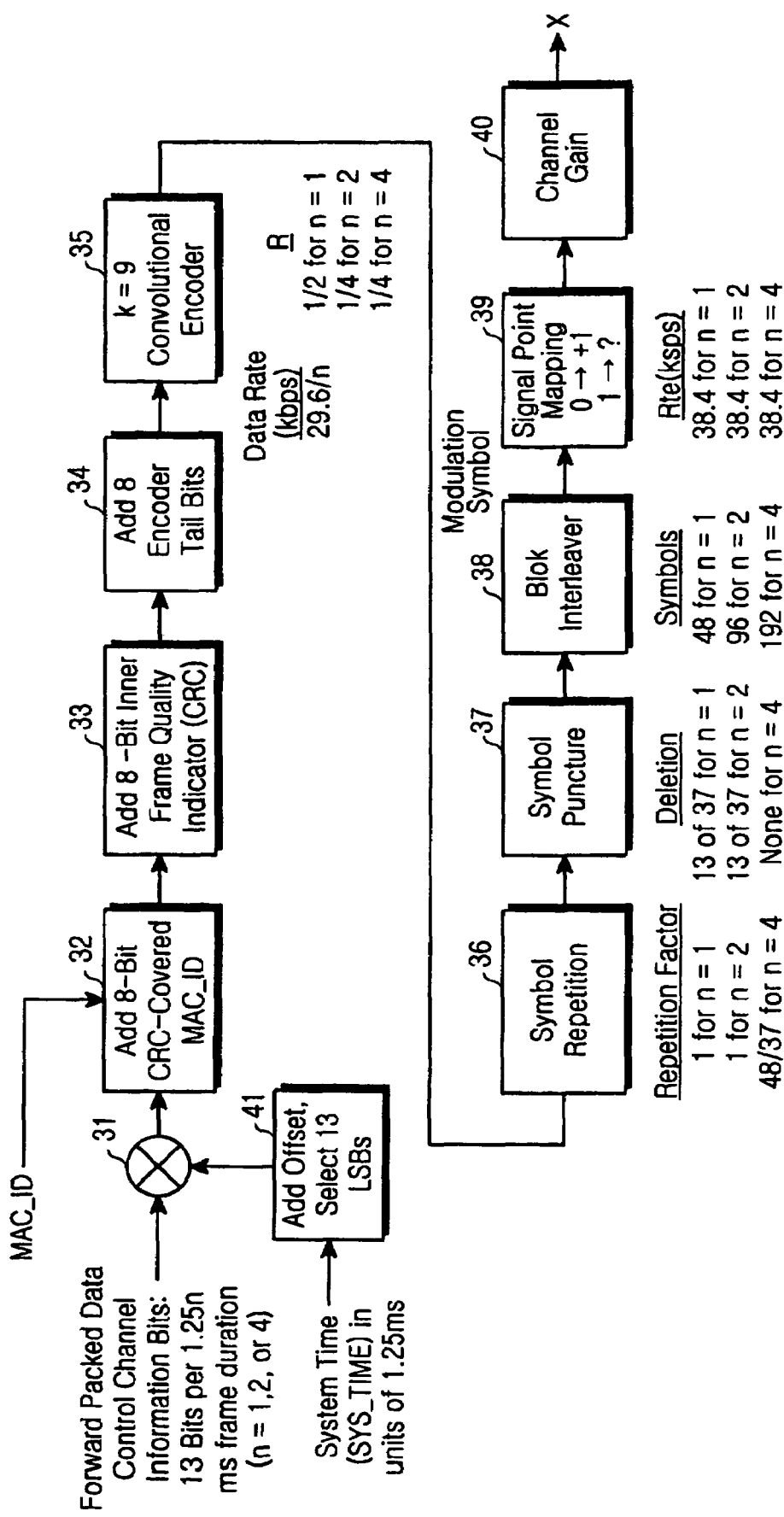
FIG. 2 is a diagram illustrating a structure of a forward packet data control channel in a conventional CDMA2000 1x EV-DV system.

Referring to FIGS. 1 and 4A, when a mobile station A (21) is monitoring F-PDCCH for a no-operation interval (NOI) in which there is no F-PDCCH to be transmitted thereto, a reception SNR is very low. Such a situation can occur when although the mobile station A (21) sent a packet request to a base station 10, the base station 10 cannot service the mobile station A (21) until a predetermined time because it is servicing another mobile station. Because received data is not the transmission data actually targeting the mobile station A (21), the SFI of F-PDCCH on the received data is not identical to the SFI of F-PDCCH assigned to the mobile station A (21), and because F-PDCCH is out of time alignment, the received data is recognized as random data whose error rate is ½. Therefore, the received data is regarded as data received through a channel environment where the SNR is very low, and MD_MLS has a very small value.

Referring to FIGS. 1 and 4B, when the mobile station A (21) receives F-PDCCH in an idle state where the base station 10 transmits no F-PDCCH, a reception SNR is very low. Such a situation can occur when although the mobile station A (21) sent a packet request to the base station 10, the base station 10 does not service the mobile station A (21) until a predetermined time according to scheduling. That is, because a receiver of the mobile station A (21) receives and Viterbi-decodes noises, an error rate of received symbols approximates ½. In this case, most data fails in decoding. Therefore, MD_MLS has a very small value.

Referring to FIGS. 1 and 4C, when F-PDCCH is normally assigned to the mobile station A (21), an SNR of a received F-PDCCH signal is very high. In this case, an error rate of received symbols is commonly smaller than 0.001. In particular, the power of packet data control channels is generally set very high. Actually, about 25% of the total transmission power of a base station can be assigned for packet data control channels and the reception SNR is very high. Therefore, MD_MLS has a very large value.

A description will now be made of a method for reducing a false alarm rate, a rate of information indicating occurrence of a F-PDCCH error to improve the performance of a mobile communication system.

Figure 9:
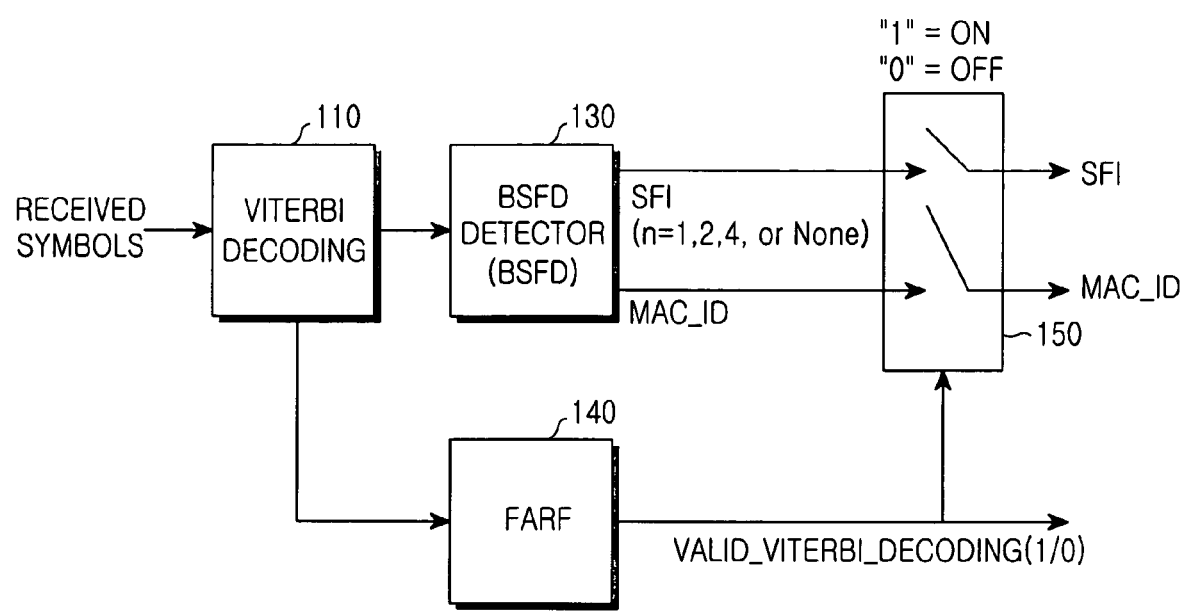
FIG. 9 is a diagram illustrating a structure of a receiver having a false alarm reducing function using MD_MLS according to an embodiment of the present invention.

FIG. 9 is a diagram illustrating a structure of a receiver having a false alarm reducing function using MD_MLS according to an embodiment of the present invention. Referring to FIG. 9, an F-PDCH receiver includes a Viterbi decoding part 110 for Viterbi-decoding received symbols and calculating MD_MLS, a BSFD detector 130 for detecting a blind slot format and outputting slot format information (SFI) and MAC_ID, and a false alarm reduction function (FARF) 140 for outputting Viterbi decoding value including information for indicating a false alarm (Valid_Viterbi_Decoding (1/0)). Further, the F-PDCH receiver includes a switch 150 connected to the BSFD detector 130, for outputting the BSFD detection result according to the Viterbi decoding value. The false alarm reduction function 140 can be used as an inner function block or an outer function block of the BSFD detector 130.

The false alarm reduction function 140 determines whether a detection result of the BSFD detector 130 is valid, and controls the switch 150 according to the determination result. For convenience, the inner CRC checker 121 and the outer CRC checker 122 of FIG. 6, connected to the BSFD detector 130, for transmitting the BSFD detection result, are not illustrated in FIG. 9. A detailed description of the false alarm reduction function 140 will be made herein below with reference to the accompanying drawings.

Figure 10:
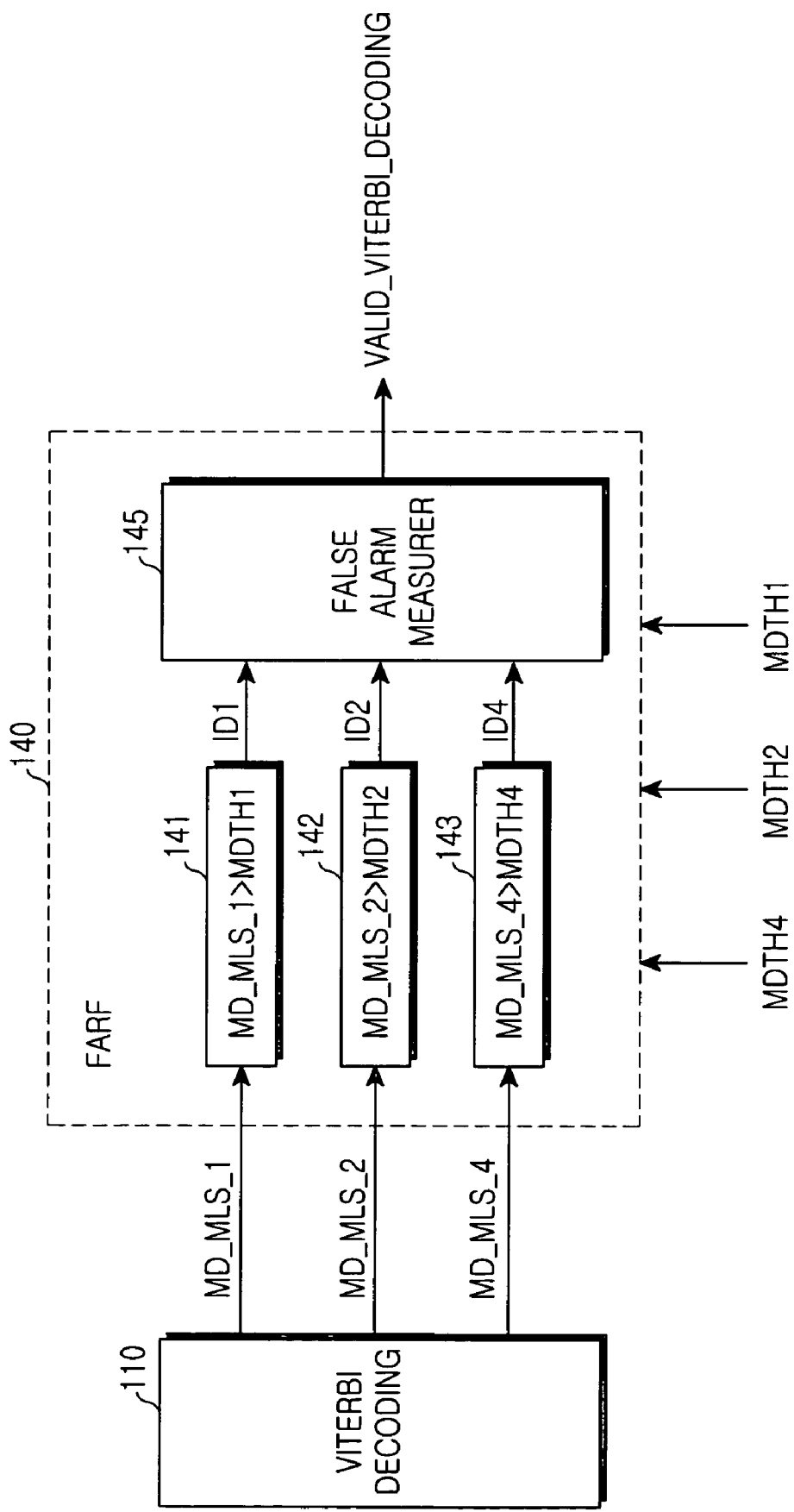
FIG. 10 is a diagram illustrating a detailed structure of a false alarm reduction function in an F-PDCCH receiver according to an embodiment of the present invention.

FIG. 10 is a diagram illustrating a detailed structure of a false alarm reduction function in an F-PDCCH receiver according to an embodiment of the present invention. Referring to FIG. 10, a false alarm reduction function 140 includes comparators 141, 142 and 143 for comparing MD_MLS_1, MD_MLS_2 and MD_MLS_4 received from the Viterbi decoding part 110 with predetermined thresholds thereof, and a false alarm measurer 145 for measuring a false alarm based on the comparison results output from the comparators 141, 142 and 143.

The Viterbi decoding part 110 transmits MD_MLS_1, MD_MLS_2 and MD_MLS_4 acquired through path metric calculation to the false alarm reduction function 140. Then the false alarm reduction function 140 compares the MD_MLS_1, MD_MLS_2 and MD_MLS_4 with the predetermined thresholds MDTH1, MDTH2 and MDTH4, and transmits the comparison results ID1, ID2 and ID4 to the false alarm measurer 145. Here, the predetermined thresholds are previously determined through experiments. For convenience, a value of ID1 is set to '1', if a value of MD_MLS_1 is larger than or equal to MDTH1. Also, the ID2 and ID4 are set in the same way. The thresholds MDTH1, MDTH2 and MDTH4 can be pre-stored in the false alarm reduction function 140 or can be adaptively changed, under the control of an external controller or the system. For convenience, it is assumed herein that the thresholds MDTH1, MDTH2 and MDTH4 are previously stored in the false alarm reduction function 140.

The false alarm measurer 145 finally outputs a signal for a Viterbi decoding value through combination of ID1, ID2 and ID4 information using a circuit or look-up table determined by a decision method defined by the system. For example, a decision formula of Equation (10) can be used as a method for reducing false alarms.

IF (ID1=="0" and ID2=="0" and ID3=="0") Then
    VALID_VITERBI_DECODING="0"     (10)

In Equation (10), if a Viterbi decoding value is set to '0' (VALID_VITERBI_DECODING='0'), it indicates that the current Viterbi decoding result is invalid. Therefore, the Viterbi decoding value signal is a signal indicating whether 13-bit information word or MAC_ID='0' information word output from the current F-PDCCH is valid. For example, if the Viterbi decoding value is '0', it indicates that the Viterbi decoding output is defective. However, if the Viterbi decoding value is '1', it indicates that the Viterbi decoding output is correct. The F-PDCCH receiver outputs a detection result of the BSFD detector 130, detected according to the Viterbi decoding value. That is, the switch 150 selectively outputs the detection result of the BSFD detector 130 according to the Viterbi decoding value, thereby reducing a false alarm rate.

An operation of a F-PDCCH receiver using MD_MLS and a false alarm function will be described herein below with reference to the accompanying drawings.

Figure 11:
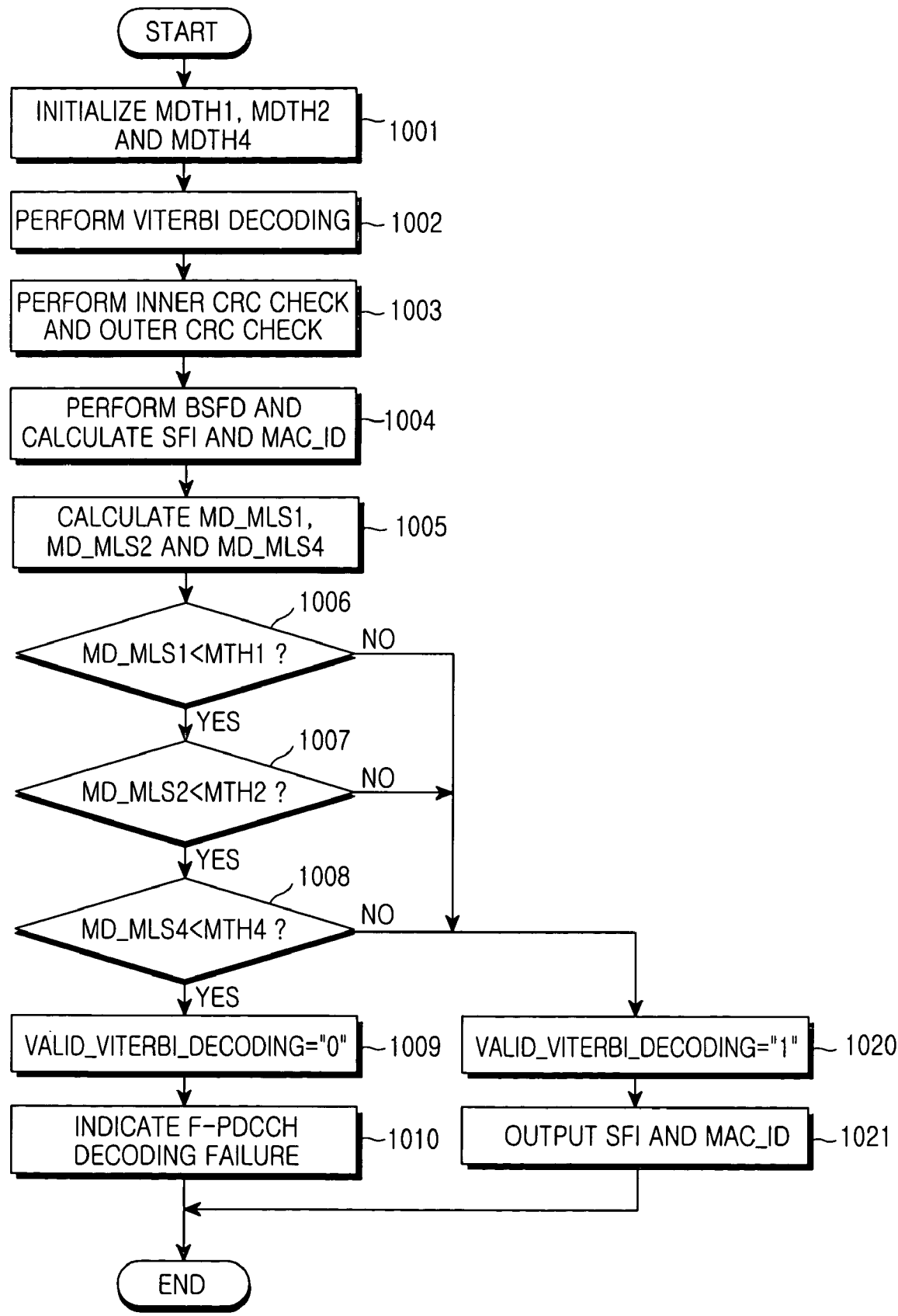
FIG. 11 is a diagram illustrating an operation of an F-PDCCH receiver according to an embodiment of the present invention.

FIG. 11 is a flow chart illustrating an operation of a F-PDCCH receiver according to an embodiment of the present invention. Referring to FIG. 11, in step 1001, a F-PDCCH receiver initializes thresholds MDTH1, MDTH2 and MDTH4. In step 1002, the F-PDCCH receiver performs Viterbi decoding, and calculates 29-bit data, and MD_MLS_1, MD_MLS_2 and MD_MLS4 using the decoding result.

In step 1003, the F-PDCCH receiver performs a CRC check using the inter CRC checker 121 and the outer CRC checker 122. In step 1004, the F-PDCCH receiver performs a BSFD algorithm using the BSFD detector 130, and detects SFI and MAC_ID.

In step 1005, the F-PDCCH receiver receives MD_MLS_1, MD_MLS_2 and MD_MLS_4 from the Viterbi decoding part 110. Thereafter, the F-PDCCH receiver compares the MD_MLS_1, MD_MLS_2 and MD_MLS_4 with the thresholds MDTH1, MDTH2 and MDTH4, and outputs ID1, ID2 and ID4 as the comparison results. Specifically, in step 1006, the F-PDCCH receiver determines whether MD_MLS_1 output from the Viterbi decoding part 110 is smaller than the threshold MDTH1. If MD_MLS_1 is smaller than MDTH1, the F-PDCCH receiver compares MD_MLS_2 with the threshold MDTH2 in step 1007. If MD_MLS_2 is smaller than the threshold MDTH2, the F-PDCCH receiver compares MD_MLS_4 with the threshold MDTH4 in step 1008. If MD_MLS_4 is smaller than the threshold MDTH4, because a difference between different paths compared with a maximum likelihood path, i.e., a survivor path and a competitor path, is small, it is difficult to determine the maximum likelihood path. As a result, it is difficult to correctly decode forward packet data control channels. Therefore, the F-PDCCH receiver sets the Viterbi decoding value to '0' in step 1009, and indicates a F-PDCCH decoding failure in step 1010.

However, if it is determined in steps 1006 to 1008 that MD_MLS_1, MD_MLS_2 and MD_MLS_4 are larger than or equal to the thresholds MDTH1, MDTH2 and MDTH4, because a path metric difference is large, it is possible to determine a maximum likelihood path. As a result, it is possible to correctly decode forward packet data control channels. Therefore, the F-PDCCH receiver sets the Viterbi decoding value to '1' (VALID_VITERBI_DECODING='1') in step 1020, and outputs SFI and MAC_ID in step 1021.

In the operation of steps 1006 to 1008, the false alarm reduction function 140 of the F-PDCCH receiver compares MD_MLS_1, MD_MLS_2 and MD_MLS_4 calculated by the Viterbi decoding part 110 with the thresholds MDTH1, MDTH2 and MDTH4, and outputs ID1, ID2 and ID4 for the MD_MLS_1, MD_MLS_2 and MD_MLS_4, respectively. The IDs output from the false alarm reduction function 140 have a value of '0' or '1'. If ID1='0', ID2='0' and ID4='0', the false alarm measurer 145 outputs a Viterbi decoding value of '0', and otherwise, the false alarm measurer 145 outputs a Viterbi decoding value of '1'. However, the decision method proposed for the false alarm measurer 145 can be set differently by a user or a system, and the embodiment of the present invention pre-performs the decision method using the false alarm measurer 134 thereby reducing a false alarm rate of received forward packet data control channels.

As described above, a mobile station selected by a base station fails to correctly receive F-PDCCH transmitted by the base station due to noises or disturbances, and in particular, mistakes the MAC_ID for an all-zero MAC_ID, i.e., Walsh mask update information, due to the F-PDCCH error. Therefore, the false alarm reduction function sets a Viterbi decoding value to '0' and outputs a signal indicating that a Walsh mask update information is invalid, thereby preventing misoperation of the mobile station.

As can be understood from the foregoing description, the present invention provides a false alarm reduction function for previously determining whether a decoding result of a forward packet control channel is true or false, and generates a false alarm for the packet data control channel according to the Viterbi decoding value generated in the false alarm reduction function, thereby reducing a false alarm rate and thus preventing a waste of reverse channel resources and interference due to misoperation of the mobile station. In addition, in a noise channel interval or an interval where other users are serviced, a Walsh mask update error caused by a MAC_ID error is reduced, thereby conserving battery power of the mobile station and increasing reverse channel capacity.

While the invention has been shown and described with reference to a certain embodiment thereof, it should be understood by those skilled in the art that various changes in form and details may be made therein without departing from the spirit and scope of the invention as defined by the appended claims.

What is claimed is:

1. A packet data control channel receiver in a mobile communication system having a packet data control channel capable of transmitting packet data and transmitting control information related to transmission of the packet data, comprising:
    a packet data control channel decoding part for decoding symbols received over the packet data control channel and outputting a decoded information word and at least one decoding probability value of the information word;
    a false alarm reduction function for comparing the at least one decoding probability value of the information word with a corresponding predetermined threshold, and outputting a decoding validity value according to the comparison result;
    a switch for switching an output of the information word according to the decoding validity value;
    a blind slot format detector for detecting a particular slot format when the packet data control channel has multiple slot lengths; and
    a Cyclic Redundancy Check (CRC) checking part for performing CRC check on the information word output from the packet data control channel decoding part, and outputting the CRC check result to the blind slot format detector.

2. The packet data control channel receiver of claim 1, wherein the packet data control channel decoding part calculates the at least one probability value of the information word using a difference between a path metric of a survivor path and a path metric of a competitor path.

3. The packet data control channel receiver of claim 1, wherein the false alarm reduction function comprises:
    a comparator for comparing the at least one decoding probability value of the information word with the predetermined threshold; and
    a false alarm measurer for determining decoding validity according to an output of the comparator, and outputting the decoding validity value.

4. The packet data control channel receiver of claim 1, wherein the blind slot format detector sets slot format information to a value indicating no transmission of data if an output of the CRC checking part indicates an error.

5. The packet data control channel receiver of claim 1, wherein the false alarm reduction function comprises:
    comparators for comparing a plurality of decoding probability values of the information word with corresponding thresholds previously set for the multiple slot lengths; and
    a false alarm measurer for determining decoding validity according to an output of the comparator, and outputting a decoding validity value.

6. The packet data control channel receiver of claim 1, wherein the packet data control channel decoding part comprises:
    a Viterbi decoder for decoding the received symbols and outputting a decoded information word; and
    a calculator for calculating the at least one probability value of the information word output from the Viterbi decoder.

7. The packet data control channel receiver of claim 6, wherein the calculator calculates the at least one probability value of the information word using the following equation, $$MD\_MLS = |\lambda_{surv}(L) - \lambda_{comp}(L)|$$

$$= \left| \sum_{k=0}^{L-1} \log\{Pr(Y | X_{surv})\} - \sum_{k=0}^{L-1} \log\{Pr(Y | X_{comp})\} \right|$$

where MD_MLS denotes the at least one probability value calculated as a metric difference between two path metrics input to a maximum-likelihood state, $\lambda_{surv}(L)$ denotes a path metric of a survivor path at a zero state in an $L^{th}$ branch, L denotes a length of the information word, k denotes zero-based indexes of each sequential bit of the information word, $\lambda_{comp}(L)$ denotes a path metric of a competitor path in a zero state in the $L^{th}$ branch, X denotes a sequence transmitted from a transmission side, and Y denotes a sequence received over the packet data control channel.

8. A method for reducing reception errors in a packet data control channel by a receiver receiving the packet data control channel in a mobile communication system having the packet data control channel capable of transmitting packet data and transmitting control information related to transmission of the packet data, the method comprising the steps of:
    decoding symbols received over the packet data control channel and outputting a decoded information word and at least one decoding probability value of the information word;
    comparing the at least one decoding probability value of the information word with a corresponding predetermined threshold, and outputting a decoding validity value according to the comparison result;
    switching an output of the information word according to the decoding validity value;
    detecting a particular slot format when the packet data control channel has multiple slot lengths; and
    performing Cyclic Redundancy Check (CRC) check on the information word, and outputting the CRC check result.

9. The method of claim 8, wherein the at least one probability value of the information word is calculated using a difference between a path metric of a survivor path and a path metric of a competitor path.

10. The method of claim 8, wherein the decoding validity value is determined by comparing the at least one decoding probability value of the information word with the corresponding predetermined threshold to determine decoding validity.

11. The method of claim 8, wherein the step of outputting the CRC check result comprises the step of setting slot format information to a value indicating no transmission of data if the CRC check result indicates an error.

12. The method of claim 8, wherein the decoding validity value is determined by comparing a plurality of decoding probability values of the information word with corresponding thresholds previously set for the multiple slot lengths to determine decoding validity.

13. The method of claim 8, wherein the step of outputting the at least one decoding probability value of the information word comprises the steps of:

Viterbi-decoding the received symbols and outputting a decoded information word; and calculating the at least one probability value of the Viterbi-decoded information word.

14. The method of claim 13, wherein the at least one probability value of the information word is calculated using the following equation, $$MD\_MLS = |\lambda_{surv}(L) - \lambda_{comp}(L)|$$
$$= \left| \sum_{k=0}^{L-1} \log\{Pr(Y \mid X_{surv})\} - \sum_{k=0}^{L-1} \log\{Pr(Y \mid X_{comp})\} \right|$$

where MD_MLS denotes the at least one probability value calculated as a metric difference between two path metrics input to a maximum-likelihood state, $\lambda_{surv}(L)$ denotes a path metric of a survivor path at a zero state in an $L^{th}$ branch, L denotes a length of the information word, k denotes zero-based indexes of each sequential bit of the information word, $\lambda_{comp}(L)$ denotes a path metric of a competitor path in a zero state in the $L^{th}$ branch, X denotes a sequence transmitted from a transmission side, and Y denotes a sequence received over the packet data control channel.

* * * * *